(12) United States Patent
Bonk et al.

(10) Patent No.: US 7,851,036 B2
(45) Date of Patent: *Dec. 14, 2010

(54) GAS-FILLED CUSHIONING DEVICE

(75) Inventors: Henry W Bonk, Wallingford, CT (US); David Goldwasser, Chesterfield, MO (US)

(73) Assignee: BASF Coatings GmbH, Muenster (DE)

( * ) Notice: Subject to any disclaimer, the term of this patent is extended or adjusted under 35 U.S.C. 154(b) by 86 days.

This patent is subject to a terminal disclaimer.

(21) Appl. No.: 10/784,090

(22) Filed: Feb. 20, 2004

(65) Prior Publication Data

US 2004/0166268 A1    Aug. 26, 2004

Related U.S. Application Data

(60) Division of application No. 10/377,540, filed on Feb. 28, 2003, now Pat. No. 6,730,379, which is a division of application No. 09/170,790, filed on Oct. 13, 1998, now Pat. No. 6,599,597, which is a continuation of application No. 08/475,276, filed on Jun. 7, 1995, now abandoned.

(51) Int. Cl.
*B32B 27/08* (2006.01)
*B32B 1/08* (2006.01)
(52) U.S. Cl. .................... 428/35.7; 428/34.1; 428/36.6; 428/36.7; 428/36.8; 428/36.91
(58) Field of Classification Search ............... 428/34.1, 428/35.2, 35.4, 35.7, 36.6–36.8
See application file for complete search history.

(56) References Cited

U.S. PATENT DOCUMENTS

| | | | |
|---|---|---|---|
| 3,718,494 A | 2/1973 | Jacobson | |
| 4,082,854 A | 4/1978 | Yamada et al. | |
| 4,219,945 A | 9/1980 | Rudy | |
| 4,257,176 A | 3/1981 | Hartung et al. | |
| 4,340,626 A | 7/1982 | Rudy | |
| 4,344,987 A | 8/1982 | Ostertag et al. | |

(Continued)

FOREIGN PATENT DOCUMENTS

CA    2123053    5/1994

(Continued)

OTHER PUBLICATIONS

Bayer Sales Brochure, Enginerring Polymers Properties Guide, Thermoplastics and Thermosets, May 1995, 3 pages.

(Continued)

*Primary Examiner*—Rena L Dye
*Assistant Examiner*—Walter B Aughenbaugh
(74) *Attorney, Agent, or Firm*—Harness, Dickey & Pierce, P.L.C.

(57) ABSTRACT

A shoe is fabricated from an upper structure and a sole structure wherein the sole structure contains a gas-filled cushioning device composed of a multi-layer film formed into a gas-filled membrane having an interior compartment enclosing at least one capture gas. The multi-layer film comprises an outer layer of an elastomeric thermoplastic material such as a polyurethane, an inner layer of an elastomeric thermoplastic material such as a polyurethane and a barrier layer interposed therebetween which is derived from a combination of at least one ethylene-vinyl alcohol copolymer and up to about 50 wt. % of an aliphatic thermoplastic urethane.

9 Claims, 7 Drawing Sheets

U.S. PATENT DOCUMENTS

| | | | |
|---|---|---|---|
| 4,410,595 A * | 10/1983 | Matsumoto et al. | 428/412 |
| 4,423,185 A | 12/1983 | Matsumoto et al. | |
| 4,429,076 A | 1/1984 | Saito et al. | |
| 4,501,790 A | 2/1985 | Aizawa et al. | |
| 4,513,058 A | 4/1985 | Martin | |
| 4,536,425 A | 8/1985 | Hekal | |
| 4,551,518 A | 11/1985 | Matsumoto et al. | |
| 4,557,859 A | 12/1985 | Maeda et al. | |
| 4,610,099 A | 9/1986 | Signori | |
| 4,614,208 A | 9/1986 | Skarelius | |
| 4,639,471 A | 1/1987 | Hirai et al. | |
| 4,660,831 A | 4/1987 | Kralik | |
| 4,681,797 A | 7/1987 | Van Iseghem | |
| 4,692,361 A | 9/1987 | Johnston et al. | |
| 4,717,618 A * | 1/1988 | Tse et al. | 428/213 |
| 4,722,131 A | 2/1988 | Huang | |
| 4,731,289 A | 3/1988 | Coleman | |
| 4,786,685 A | 11/1988 | Takida et al. | |
| 4,864,738 A | 9/1989 | Horovitz | |
| 4,874,670 A | 10/1989 | Boon et al. | |
| 4,887,367 A | 12/1989 | Mackness et al. | |
| 4,890,822 A | 1/1990 | Ezure et al. | |
| 4,927,689 A | 5/1990 | Markiewicz | |
| 4,936,029 A | 6/1990 | Rudy | |
| 4,960,639 A | 10/1990 | Oda et al. | |
| 4,978,394 A | 12/1990 | Ostertag et al. | |
| 4,999,229 A | 3/1991 | Moritani et al. | |
| 5,003,002 A | 3/1991 | Ofstein | |
| 5,030,404 A | 7/1991 | Bonnebat et al. | |
| 5,036,110 A * | 7/1991 | Moureaux | 521/137 |
| 5,036,113 A | 7/1991 | Boon et al. | |
| 5,036,603 A | 8/1991 | Dischler | |
| 5,042,176 A | 8/1991 | Rudy | |
| 5,042,781 A | 8/1991 | Ezure et al. | |
| 5,053,455 A | 10/1991 | Kroggel et al. | |
| 5,059,245 A | 10/1991 | Phillips et al. | |
| 5,090,010 A | 2/1992 | Takahashi | |
| 5,096,756 A | 3/1992 | Walters | |
| 5,157,082 A | 10/1992 | Johnson | |
| 5,181,717 A | 1/1993 | Donntag | |
| 5,198,042 A | 3/1993 | Masumoto et al. | |
| 5,215,124 A | 6/1993 | Hattori et al. | |
| 5,246,761 A | 9/1993 | Sasaki | |
| 5,292,824 A | 3/1994 | Nagai et al. | |
| 5,294,112 A | 3/1994 | Smith | |
| 5,300,192 A * | 4/1994 | Hansen et al. | 162/184 |
| 5,300,334 A | 4/1994 | Niederst et al. | |
| 5,332,767 A | 7/1994 | Reisser et al. | |
| 5,346,950 A | 9/1994 | Negi et al. | |
| 5,393,832 A | 2/1995 | Moulies et al. | |
| 5,409,041 A | 4/1995 | Yoshida et al. | |
| 5,416,988 A | 5/1995 | Potter et al. | |
| 5,429,852 A | 7/1995 | Quinn | |
| 5,436,295 A | 7/1995 | Nishikawa et al. | |
| 5,450,235 A * | 9/1995 | Smith et al. | 359/529 |
| 5,456,787 A | 10/1995 | Myles | |
| 5,458,935 A | 10/1995 | Aizner | |
| 5,462,980 A | 10/1995 | Bastioli et al. | |
| 5,489,455 A | 2/1996 | Nugent, Jr. et al. | |
| 5,498,662 A | 3/1996 | Tanaka et al. | |
| 5,532,284 A | 7/1996 | Bartlett et al. | |
| 5,540,770 A | 7/1996 | Schmid et al. | |
| 5,567,489 A | 10/1996 | Allen et al. | |
| 5,578,372 A | 11/1996 | Murakami | |
| 5,591,798 A | 1/1997 | Patel | |
| 5,601,889 A | 2/1997 | Chundury et al. | |
| 5,605,961 A * | 2/1997 | Lee et al. | 525/66 |
| 5,609,962 A | 3/1997 | Ouhadi | |
| 5,612,101 A | 3/1997 | Furuta et al. | |
| 5,633,065 A | 5/1997 | Matsukura et al. | |
| 5,645,923 A | 7/1997 | Matsuo et al. | |
| 5,648,149 A | 7/1997 | Rukavina | |
| 5,662,738 A | 9/1997 | Schmid et al. | |
| 5,693,424 A | 12/1997 | Watanabe et al. | |
| 5,700,560 A | 12/1997 | Kotani et al. | |
| 5,713,141 A | 2/1998 | Mitchell | |
| 5,766,751 A * | 6/1998 | Kotani et al. | 428/323 |
| 5,925,054 A * | 7/1999 | Taylor et al. | 606/153 |
| 5,952,065 A * | 9/1999 | Mitchell et al. | 428/35.4 |
| 6,013,340 A * | 1/2000 | Bonk et al. | 428/35.2 |
| 6,203,868 B1 * | 3/2001 | Bonk et al. | 428/35.4 |
| 6,321,465 B1 | 11/2001 | Bonk et al. | |
| 6,391,405 B1 | 5/2002 | Bonk et al. | |
| 6,599,597 B1 * | 7/2003 | Bonk et al. | 428/36.6 |
| 6,652,940 B2 * | 11/2003 | Bonk et al. | 428/36.6 |
| 6,692,803 B2 * | 2/2004 | Bonk et al. | 428/36.8 |
| 6,730,379 B2 * | 5/2004 | Bonk et al. | 428/36.7 |

FOREIGN PATENT DOCUMENTS

| | | |
|---|---|---|
| EP | WO 8705563 | 9/1987 |
| EP | 624463 | 4/1994 |
| FR | 2636638 | 3/1990 |
| JP | 52-069486 | 6/1977 |
| JP | 52-69486 | 6/1977 |
| JP | 58-22163 | 2/1983 |
| JP | 59-196706 | 11/1984 |
| JP | 59-116145 | 5/1987 |

OTHER PUBLICATIONS

Encyclopedia of Polymer Science and Engineering, Herman F., Mark et al., eds., 2d Ed., pp. 615-617 & 509 (1985).

Hawley's Condensed Chemical Dictionary, pp. 291,737 (rev. By Richard J. Lewis, Sr., 12th ed., 1993).

McGraw-Hill Dictionary of Scientific and Technical Terms, Sybil P. Parker, ed. 5th ed. 1994.

* cited by examiner

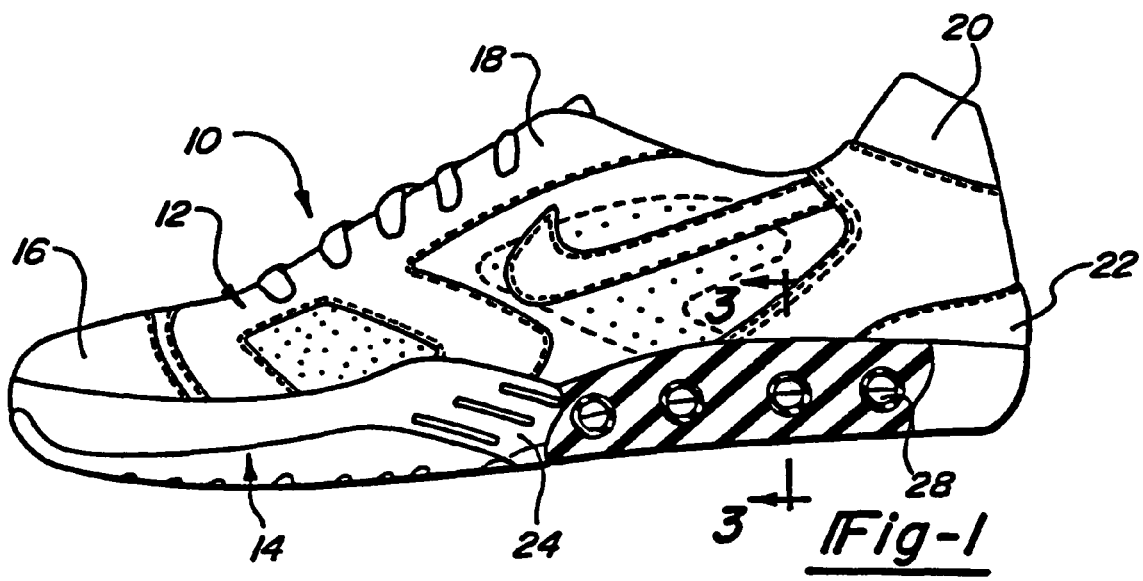
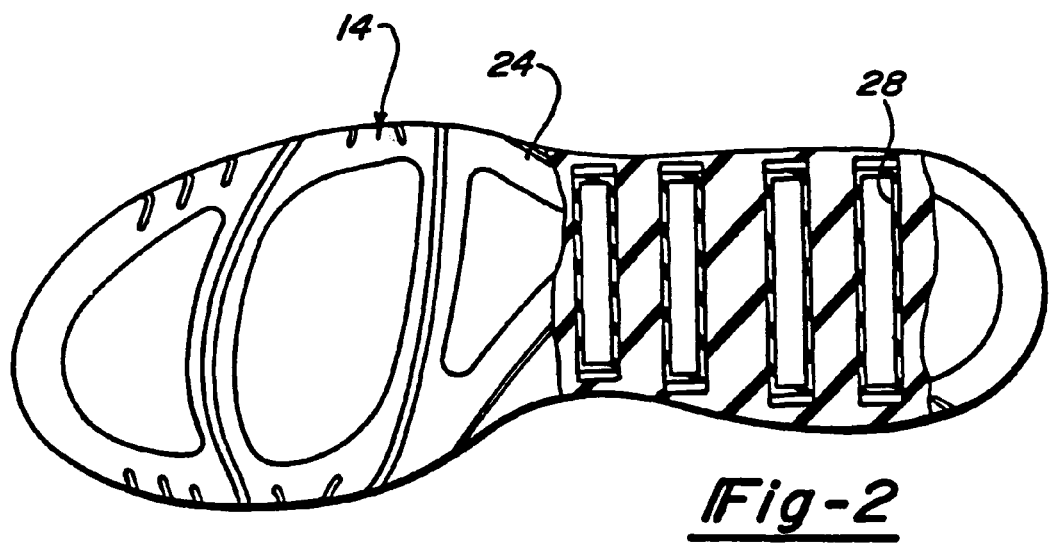
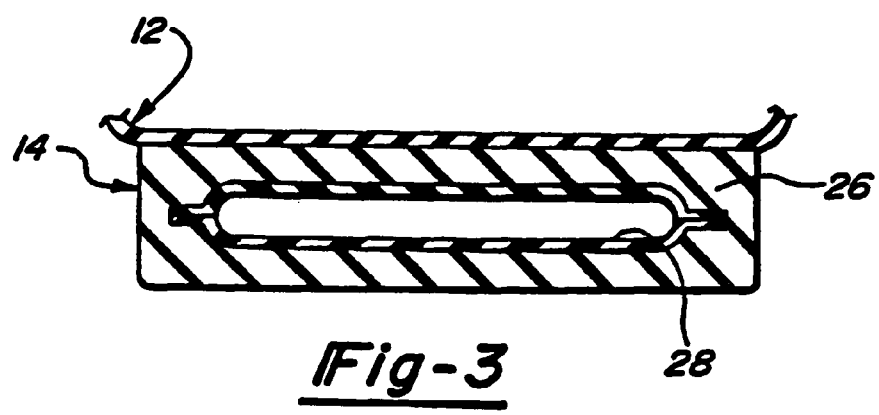

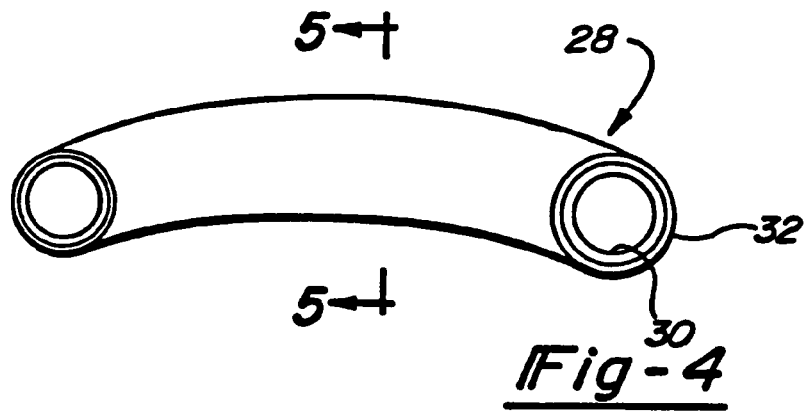
Fig-4
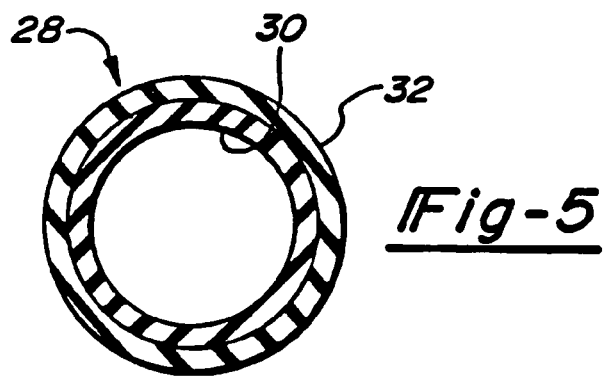
Fig-5
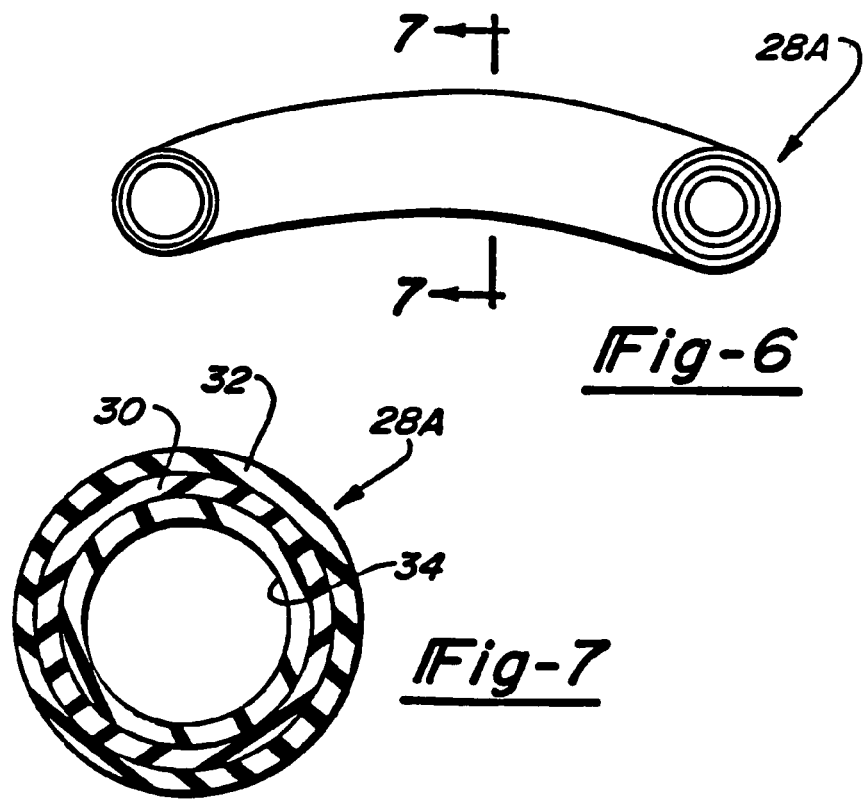
Fig-6
Fig-7

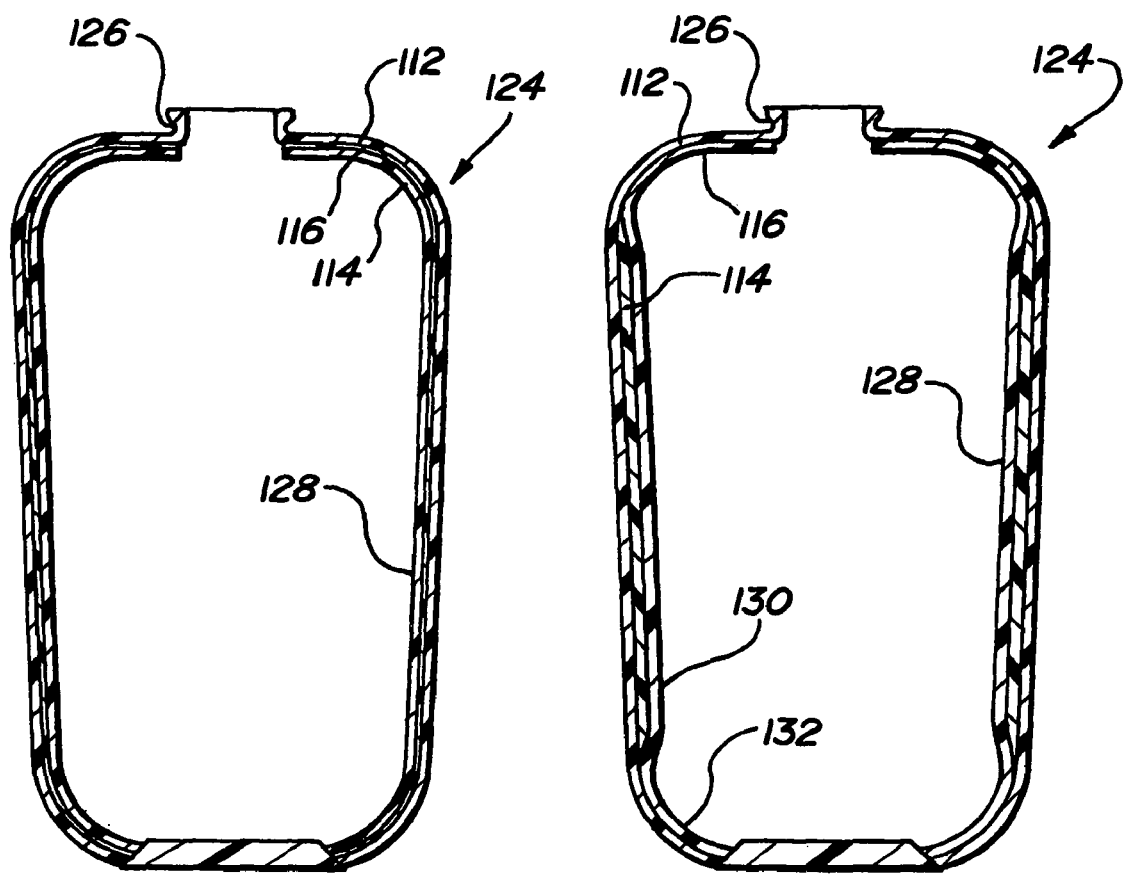

GAS-FILLED CUSHIONING DEVICE

CROSS-REFERENCE TO RELATED APPLICATIONS

This application is a division of application Ser. No. 10/377,540, filed Feb. 28, 2003 now U.S. Pat. No. 6,730,379, which is a division of application Ser. No. 09/170,790, filed Oct. 13, 1998 (U.S. Pat. No. 6,599,597), which is a continuation of application Ser. No. 08/475,276, filed Jun. 7, 1995, now abandoned.

FIELD OF THE INVENTION

The present invention relates to barrier membranes and, more particularly, to barrier membranes which, under certain embodiments, serve to selectively control the diffusion of gases through the membrane. Additionally, under certain embodiments, the membrane not only selectively controls the diffusion of gases through the membrane, but also allows for the controlled diffusion of gases normally contained in the atmosphere.

For a further understanding of the scope of the present invention, reference can be made to U.S. patent application Ser. No. 08/299,287 entitled "Cushioning Device With Improved Flexible Barrier Membrane" which was filed on Aug. 31, 1994 (U.S. Pat. No. 5,952,065); U.S. patent application Ser. No. 08/299,286 entitled "Laminated Resilient Flexible Barrier Membranes" which was filed on Aug. 31, 1994, abandoned; and U.S. patent application Ser. No. 08/475,276, abandoned, entitled "Barrier Membranes Including A Barrier Layer Employing Polyester Polyols" which is commonly owned and has been filed concurrently herewith; each of the aforementioned patent applications being expressly incorporated herein by reference.

BACKGROUND OF THE INVENTION

Barrier membranes useful for containing fluids, including liquids and/or gases, in a controlled manner have been employed for years in a wide variety of products ranging from bladders useful in inflatable objects, such as vehicle tires and sporting goods for example; to accumulators used on heavy machinery; to cushioning devices useful in footwear. Regardless of the intended use, barrier membranes must generally be flexible, resistant to environmental degradation and exhibit excellent gas transmission controls. Often, however, materials which exhibit acceptable flexibility characteristics tend to have an unacceptably low level of resistance to gas permeation. In contrast, materials which exhibit an acceptable level of resistance to gas permeation tend to have an unacceptably low level of flexibility.

In an attempt to address the concerns of both flexibility and imperviousness to gases, U.S. Pat. No. 5,036,110 which issued Jun. 30, 1991, to Moreaux describes resilient membranes for fitting hydropneumatic accumulators. According to Moreaux '110, the membrane disclosed consists of a film formed from a graft polymer which is the reaction product of an aromatic thermoplastic polyurethane with a copolymer of ethylene and vinyl alcohol (EVOH), with this film being sandwiched between layers of thermoplastic polyurethane to form a laminate. While Moreaux '110 attempts to address the concerns in the art relating to flexibility and imperviousness to gases, a perceived drawback of Moreaux is that the film described is not processable utilizing conventional sheet extrusion techniques. Thus, the present invention is directed to barrier membranes which are flexible, have good resistance to gas transmission, and under certain embodiments are processable into laminates utilizing conventional sheet extrusion techniques which are highly resistant to delamination.

While it should be understood by those skilled in the art upon review of the following specification and claims that the barrier membranes of the present invention have a broad range of applications, including but not limited to bladders for inflatable objects such as footballs, basketballs, soccer balls and inner tubes; films for food packaging; as well as the production of fuel lines and fuel storage tanks to name a few, still other highly desirable applications include their use in forming accumulators which are operable under high pressure environments.

For convenience, but without limitation, the barrier membranes of the present invention will hereinafter generally be described in terms of either accumulators or in terms of still another highly desirable application, namely for cushioning devices used in footwear. In order to fully discuss the applicability of the barrier membranes in terms of cushioning devices for footwear, a description of footwear in general is believed to be necessary.

Footwear, or more precisely, shoes generally include two major categories of components namely, a shoe upper and the sole. The general purpose of the shoe upper is to snugly and comfortably enclose the foot ideally, the shoe upper should be made from an attractive, highly durable, yet comfortable material or combination of materials. The sole, which also can be made from one or more durable materials, is particularly designed to provide traction, protect the wearer's feet and body during use which is consistent with the design of the shoe. The considerable forces generated during athletic activities require that the sole of an athletic shoe provide enhanced protection and shock absorption for the feet, ankles and legs of the wearer. For example, impacts which occur during running activities can generate forces of up to 2-3 times the body weight of an individual while certain other activities such as, for example, playing basketball have been known to generate forces of up to approximately 6-10 times an individual's body weight Accordingly, many shoes and, more particularly, many athletic shoes are now provided with some type of resilient, shock-absorbent material or shock-absorbent components to cushion the user during strenuous athletic activity. Such resilient, shock-absorbent materials or components have now commonly come to be referred to in the shoe manufacturing industry as the midsole.

It has therefore been a focus of the industry to seek midsole designs which achieve an effective impact response in which both adequate shock absorption and resiliency are appropriately taken into account. Such resilient, shock-absorbent materials or components could also be applied to the insole portion of the shoe, which is generally defined as the portion of the shoe upper directly underlining the plantar surface of the foot.

A particular focus in the shoe manufacturing industry has been to seek midsole or insert structure designs which are adapted to contain fluids, in either the liquid or gaseous state, or both. Examples of gas-filled structures which are utilized within the soles of shoes are shown in U.S. Pat. Nos. 900,867 entitled "Cushion for Footwear" which issued Oct. 13, 1908, to Miller; 1,069,001 entitled "Cushioned Sole and Heel for Shoes" which issued Jul. 29, 1913, to Guy; 1,304,915 entitled "Pneumatic Insole" which issued May 27, 1919, to Spinney; 1,514,468 entitled "arch Cushion" which issued Nov. 4, 1924, to Schopf; 2,080,469 entitled "Pneumatic Foot Support" which issued May 18, 1937, to Gilbert; 2,645,865 entitled "Cushioning Insole for Shoes" which issued Jul. 21, 1953, to Towne; 2,677,906 entitled "Cushioned Inner Sole for Shoes and Method of Making the Same" which issued May 11, 1954, to Reed; 4,183,156 entitled "Insole Construction for Articles of Footwear" which issued Jan. 15, 1980, to Rudy; 4,219,945 entitled "Footwear" which issued Sep. 2, 1980, also to Rudy; 4,722,131 entitled "Air Cushion Shoe Sole" which issued Feb. 2, 1988, to Huang; and 4,864,738 entitled "Sole Construction for Footwear" which issued Sep. 12, 1989, to Horovitz. As will be recognized by those skilled in the art, such gas filled structures often referred to in the shoe manufacturing industry as "bladders" typically fall into two broad categories, namely (1) "permanently" inflated systems such as those disclosed in U.S. Pat. Nos. 4,183,156 and 4,219,945 and (2) pump and valve adjustable systems as exemplified by U.S. Pat. No. 4,722,131. By way of further example, athletic shoes of the type disclosed in U.S. Pat. No. 4,182,156 which include "permanently" inflated bladders have been successfully sold under the trade mark "Air Sole" and other trademarks by Nike, Inc. of Beaverton, Oreg. To date, millions of pairs of athletic shoes of this type have been sold in the United States and throughout the world.

The permanently inflated bladders are typically constructed under methods using a flexible thermoplastic material which is inflated with a large molecule, low solubility coefficient gas otherwise referred to in the industry as a "super gas," such as $SF_6$. By way of example, U.S. Pat. No. 4,340,626 entitled "Diffusion Pumping Apparatus Self-Inflating Device" which issued Jul. 20, 1982, to Rudy, which is expressly incorporated herein by reference, discloses a pair of elastomeric, selectively permeable sheets of film which are formed into a bladder and thereafter inflated with a gas or mixture of gases to a prescribed pressure which preferably is above atmospheric pressure. The gas or gases utilized ideally have a relatively low diffusion rate through the selectively permeable bladder to the exterior environment while gases such as nitrogen, oxygen and argon which are contained in the atmosphere and have a relatively high diffusion rate are able to penetrate the bladder. This produces an increase in the total pressure within the bladder, by the addition of the partial pressures of the nitrogen, oxygen and argon from the atmosphere to the partial pressures of the gas or gases contained initially injected into the bladder upon inflation. This concept of a relative one-way addition of gases to enhance the total pressure of the bladder is now known as "diffusion pumping."

Under the diffusion pumping system and depending upon the bladder material and the choice of gas or gases contained therein, there is a period of time involved before a steady state of internal pressure is achieved. For example, oxygen tends to diffuse into the bladder rather quickly with the effect being an increase in the internal pressure of approximately 2.5 psi. In contrast, over the course of a number of weeks nitrogen gas will gradually diffuse into the bladder resulting in an increase of pressure to approximately 12.0 psi. The gradual increase in bladder pressure typically causes an increase in tension in the bladder skin, resulting in a volume increase due to stretching. This effect is commonly referred to in the industry as "tensile relaxation" or "creep." Thus, it is of significant importance which materials are chosen for the bladder and the choice of the captive gas mixture utilized to initially inflate the bladder to achieve a bladder which is essentially permanently inflated at a desired internal pressure and which maintains a desired internal pressure over an extended period of time.

With regard to the systems utilized within the shoe manufacturing industry prior to and shortly after the introduction of the Air Sole™ athletic shoes, many of the midsole bladders consisted of a single layer gas barrier type films made from polyvinylidene chloride based materials such as Saran® (which is a registered trademark of the Dow Chemical Co.) and which by their nature are rigid plastics, having relatively poor flex fatigue, heat sealability and elasticity. Still further, bladder films made under techniques such as laminations and coatings which involve one or more barrier materials in combination with a flexible bladder material (such as various thermoplastics) can potentially present a wide variety of problems to solve. Such difficulties with composite constructions include layer separation, peeling, gas diffusion or capillary action at weld interfaces, low elongation which leads to wrinkling of the inflated product, cloudy appearing finished bladders, reduced puncture resistance and tear strength, resistance to formation via blow-molding and/or heat-sealing and R-F welding, high cost processing, and difficulty with foam encapsulation and adhesive bonding, among others.

Yet another issue with previously known bladders is the use of tie-layers or adhesives in preparing laminates. The use of such tie layers or adhesives generally prevent regrinding and recycling of any waste materials created during product formation back into an usable product, and thus, also contribute to high cost of manufacturing and relative waste. These and other short comings of the prior art are described in more extensive detail in U.S. Pat. Nos. 4,340,626; 4,936,029 and 5,042,176, all of which are hereby expressly incorporated by reference.

With the extensive commercial success of the products such as the Air Sole™ shoes, consumers have been able to enjoy a product with a long service life, superior shock absorbency and resiliency, reasonable cost, and inflation stability, without having to resort to pumps and valves. Thus, in light of the significant commercial acceptance and success that has been achieved through the use of long life inflated gas filled bladders, it is highly desirable to develop advancements relating to such products. The goal then is to provide flexible, "permanently" inflated, gas-filled shoe cushioning components which meet, and hopefully exceed, performance achieved by such products as the Air Sole™ athletic shoes offered by Nike, Inc.

One key area of potential advancement stems from a recognition that captive gases other than the large molecule, low solubility coefficient "super gases" as described in the '156, '945 and '738 patents utilized can be replaced with less costly and possibly more environmentally friendly gases. For example, U.S. Pat. Nos. 4,936,029 and 5,042,176 specifically discuss the methods of producing a flexible bladder film that essentially maintains permanent inflation through the use of nitrogen as the captive gas. As further described in U.S. Pat. No. 4,906,502, also specifically incorporated herein by reference, many of the perceived problems discussed in the '029 and '176 patents are solved by the incorporation of mechanical barriers of crystalline material into the flexible film such as fabrics, filaments, scrims and meshes. Again, significant commercial success for footwear products using the technology described in '502 patent under the trademark Tensile Air™ sold by Nike, Inc. has been achieved. The bladders utilized therein are typically comprised of a thermoplastic urethane laminated to a core fabric three-dimensional, double bar Raschel knit nylon fabric, having $SF_6$ as the captive gas contained therein.

By way of example, an accepted method of measuring the relative permeance, permeability and diffusion of different film materials is set forth in the procedure designated as ASTM D-1434-82. According to ASTM D-1434-82, permeance, permeability and diffusion are measured by the following formulas:

Permeance $$\frac{(\text{quanitity of gas})}{(\text{area}) \times (\text{time}) \times (\text{press. diff.})} = \frac{\text{Permeance}}{(GTR)/(\text{press. diff.})}$$

$$= \frac{\text{cc.}}{(\text{sq.m})(24\,\text{hr.})(Pa)}$$

Permeability $$\frac{(\text{quantity of gas}) \times (\text{film thick})}{(\text{area}) \times (\text{time}) \times (\text{press. diff.})} = \frac{\text{Permeability}}{(GTR) \times (\text{film thick})/(\text{press. diff.})}$$

$$= \frac{(\text{cc})(\text{mil})}{(\text{sq.m})(24\,\text{hr.})(Pa)}$$

Diffusion $$\frac{(\text{quantity of gas})}{(\text{area}) \times (\text{time})} = \text{Gas Transmission Rate} \; (GTR)$$

$$= \frac{\text{cc}}{(\text{sq.m})(24\,\text{hr.})}$$

By utilizing the above listed formulas, the gas transmission rate in combination with a constant pressure differential and the film's thickness, can be utilized to define the movement of gas under specific conditions. In this regard, the preferred gas transmission rate (GTR) for a bladder in an athletic shoe component which seeks to meet the rigorous demands of fatigue resistance imposed by heavy and repeated impacts has a gas transmission rate (GTR) value of approximately 10.0 or lower and, even more preferably, a (GTR) value of 2.0 or lower, for bladders having an average thickness of approximately 20 mils.

In addition to the aforementioned, the '029 and '176 patents also discuss problems encountered with previous attempts to use co-laminated combinations of plastic material which operate as barriers to oxygen. In this regard, the principal concern was the lack of fatigue resistance of the barrier layer. As described in the '176 patent, a satisfactory co-lamination of polyvinylidene chloride (such as Saran®) and a urethane elastomer would require an intermediate bonding agent. Under such a construction, relatively complicated and expensive processing controls such as strict time-temperature relationships and the use of heated platens and pressures, coupled with a cold press to freeze the materials together under pressure would be required. Additionally, using adhesive tie layers or incorporating crystalline components into the flexible film at high enough levels to accomplish a gas transmission rate of 10.0 or less, reduces the flexibility of the film.

Cushioning devices which specifically eliminate adhesive tie layers have been known to separate or de-laminate especially along seams and edges. Thus, it has been a relatively recent focus of the industry to develop cushioning devices which reduce or eliminate the occurrence of delamination, ideally without the use of a "tie layer." In this regard, the cushioning devices disclosed in co-pending U.S. application patent Ser. Nos. 08/299,286 and 08/299,287 eliminate adhesives tie layers by providing membranes including a first layer of thermoplastic urethane and a second layer including a copolymer of ethylene and vinyl alcohol wherein hydrogen bonding occurs over a segment of the membranes between the first and second layers. While the cushioning devices disclosed in U.S. patent application Ser. No. 08/299,287 and the laminated flexible barrier membranes of U.S. patent application Ser. No. 08/299,286 are believed to offer a significant improvement in the art, still further improvements are offered according to the teachings of the present invention.

It is therefore, a principal object of the present invention to provide barrier membranes which offer enhanced flexibility, durability and resistance to the undesired transmission of fluids therethrough.

It is another object of the present invention to provide barrier membranes which can essentially be permanently inflated with nitrogen or another environmentally desirable gas or combination of gases wherein the barrier membrane provides for a gas transmission rate value of 10.0 or less, based on a 20 mils average thickness.

It is still another object of the present invention to provide barrier membranes and, particularly those employed as cushioning devices with improved clarity and consistency.

It is yet another object of the present invention to provide barrier membranes which can be formed into laminated objects such as cushioning devices or accumulators which resist delamination and do not require a tie layer between the barrier layer and the flexible layers.

It is yet another object of the present invention to provide barrier layers which are reprocessable.

It is a further object of the present invention to provide barrier membranes which are formable utilizing the various techniques including, but not limited to, blow-molding, tubing, sheet extrusion, vacuum-forming, heat-sealing and RF welding.

Still another object of the present invention is to provide barrier membranes which prevent gas from escaping along interfaces between the layers in laminated embodiments and particularly along seems via capillary action.

It is yet another object of the present invention to provide a barrier membrane which allows for normal footwear processing such as encapsulation within a formable material.

While the aforementioned objects provide guidance as to possible applications for the barrier membranes of the present invention, it should be recognized by those skilled in the art that the recited objects are not intended to be exhaustive or limiting.

SUMMARY OF THE INVENTION

To achieve the foregoing objects, the present invention provides barrier membranes which have (1) a desirable level of flexibility (or rigidity); (2) a desirable level of resistance to degradation caused by moisture; (3) an acceptable level of imperviousness to fluids which can be in the form of gases, liquids or both depending mainly on the intended use of the product; and (4) are highly resistant to delamination when employed in a multi-layer structure. Regardless of the barrier membrane embodiment, each barrier membrane in accordance with the teachings of the present invention includes a barrier layer comprised at least in part of a blend of at least one aliphatic thermoplastic urethane and at least one copolymer of ethylene and vinyl alcohol.

The aliphatic thermoplastic urethanes employed, if not commercially available, are generally formed as the reaction product of (a) at least one polyester and/or polyether diol; (b) at least one difunctional extender, and (c) at least one aliphatic isocyanate and/or diisocyanate, as will be described in greater detail below. Additionally, it may be desirable to utilize a catalyst to activate the reaction and one or more processing aids.

The term "thermoplastic" as used herein is intended to mean that the material is capable of being softened by heating and hardened by cooling through a characteristic temperature range, and as such in the softened state can be shaped into various articles under various techniques.

The term "polyester diol" as used herein is intended to preferably mean polymeric polyester diols having a molecular weight (determined by the ASTM D-4274 method) falling in the range of about 300 to about 4,000; more preferably from about 400 to about 2,000; and still more preferably between about 500 to about 1,500.

The term "polyether diol" as used herein is intended to preferably mean polymeric polyether diols having a molecular weight (determined by ASTM D-4274 method) falling in the range of about 300 to about 6,500; more preferably from about 400 to about 4,500; and still more preferably between about 500 to about 3,000.

The term "difunctional extended" is used preferably in the commonly accepted sense to one skilled in the art and includes glycols, diamines, amino alcohols and the like having a molecular weight generally falling in the range of from about 60 to about 300.

The terms "aliphatc isocyanate" and "aliphatc diisocyanate" as used herein are intended preferably to mean linear aliphatic, cycloaliphatic and hindered aromatic isocyanates and diisocyanates where the isocyanate —N— is separated from the benzenoid ring proper by at least one carbon, and hence, acts to produce light stable or "aliphatic" (poly)urethanes.

Ideally, the flexible barrier materials utilized in accordance with the teachings of the present invention should be capable of containing a captive gas for a relatively long period of time. In a highly preferred embodiment, for example, the barrier membrane should not lose more than about 20% of the initial inflated gas pressure over a period of two years. In other words, products inflated initially to a steady state pressure of between 20.0 to 22.0 psi should retain pressure in the range of about 16.0 to 18.0 psi.

Additionally, the barrier materials utilized should be flexible, relatively soft and compliant and should be highly resistant to fatigue and be capable of being welded to form effective seals typically achieved by RF welding or heat sealing. The barrier material should also have the ability to withstand high cycle loads without failure, especially when the barrier material utilized has a thickness of between about 5 mils to about 50 mils. Another important characteristic of the barrier membrane is that they should be processable into various shapes by techniques used in high volume production. Among these techniques known in the art are extrusion, blow molding, injection molding, vacuum molding, rotary molding, transfer molding and pressure forming. The barrier membranes of the present invention should be preferably formable by extrusion techniques, such as tubing or sheet extrusion, including extrusion blow molding particularly at sufficiently high temperatures to attain the desired "adhesive" or "chemical" bonding as will be described in greater detail below. These aforementioned processes should give rise to products whose cross-sectional dimensions can be varied.

As alluded to above, a significant feature of the barrier membranes of the present invention is the ability under embodiments formed into products intended to be inflated (such as cushioning devices for footwear) to control diffusion of mobile gases through the membrane and to retain the captive gases contained therein. By the present invention, not only are super gases usable as captive gases, but nitrogen gas may also be used as a captive gas due to the performance of the barrier. The practical effect of providing a barrier membrane for which nitrogen gas is a captive gas is significant in terms of protection of the earth's ozone and global warming.

Under the present invention, if the barrier membrane is formed into a product such as a cushioning device, the membrane may be initially inflated with nitrogen gas or a mixture of nitrogen gas and one or more super gases or with air. If filled with nitrogen or a mixture of nitrogen and one or more super gases, an increment of pressure increase results from the relatively rapid diffusion of oxygen gas into the membrane, since the captive gas is essentially retained within the membrane. This effectively amounts to an increase in pressure of not greater than about 2.5 psi over the initial inflation pressure and results in a relatively modest volume growth of the membrane of between 1 to 5%, depending on the initial pressure. However, if air is used as the inflatant gas, oxygen tends to diffuse out of the membrane while the nitrogen is retained as the captive gas. In this instance, the diffusion of oxygen out of the membrane and the retention of the captive gas results in an incremental decrease of the steady state pressure over the initial inflation pressure.

A further feature of the present invention is the enhanced bonding which occurs between contiguous layers, thus, eliminating the need for adhesive tie layers. This is generally accomplished by laminating the first and second layers together using conventional techniques and thus, the laminated barrier membranes of the present invention are characterized in that significant hydrogen bonding occurs between a first layer formed from a blend of at least one aliphatic thermoplastic urethane and a copolymer of ethylene and vinyl alcohol, and a second layer of thermoplastic urethane. In addition to the occurrence of hydrogen bonding, it is theorized that there will also generally be a certain amount of covalent bonding between the first and second layers, especially when lesser amounts of the copolymer of ethylene and vinyl alcohol is used in the first layer and the thermoplastic urethanes of both the first and second layers have similar functionalities.

This invention has many other advantages which will be more apparent from consideration of the various forms and embodiments of the present invention. Again, while the embodiments shown in the accompanying drawings which form a part of the present specification are illustrative of embodiments employing the barrier membranes of the present invention, it should be clear that the barrier membranes have extensive application possibilities. Various exemplary embodiments will now be described in greater detail for the purpose of illustrating the general principles of the invention, without considering the following detailed description in the limiting sense.

BRIEF DESCRIPTION OF THE DRAWINGS

FIG. 1 is a side elevational view of an athletic shoe in accordance with the present invention with a portion of the midsole cut-a-way to expose a cross-sectional view;

FIG. 2 is a bottom elevational view of the athletic shoe of FIG. 1 with a portion cut-a-way to expose another cross-sectional view;

FIG. 3 is a section view taken alone line 3-3 of FIG. 1;

FIG. 4 is a fragmentary side perspective view of one embodiment of a tubular-shaped, two-layer cushioning device in accordance with the present invention;

FIG. 5 is a sectional view taken along line 4-4 of FIG. 4;

FIG. 6 is a fragmentary side perspective view of a second embodiment of a tubular-shaped, three-layer cushioning device in accordance with the present invention;

FIG. 7 is a sectional side view taken along line 6-6 of FIG. 6;

FIG. 19 is a perspective view of an accumulator formed from a laminated membrane according to the teachings of the present invention;

FIG. 20 is a perspective view of a second accumulator embodiment formed from a laminated membrane according to the teachings of the present invention;

DETAILED DESCRIPTION OF THE PREFERRED EMBODIMENTS

Figure 8:
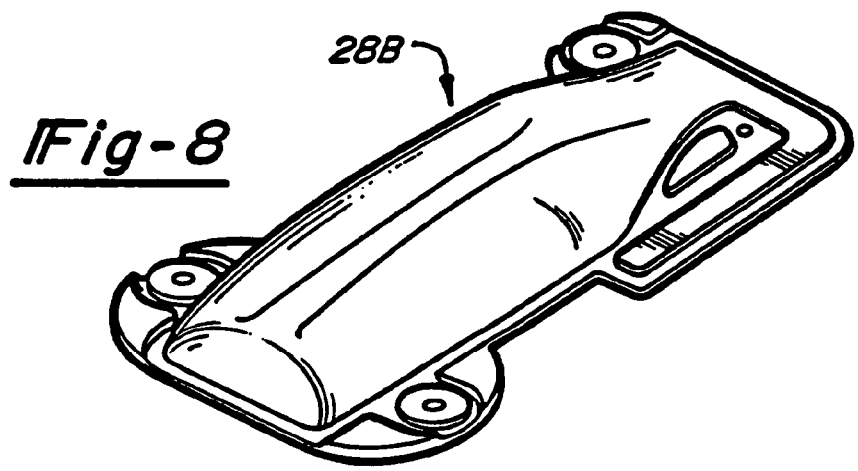
FIG. 8 is a perspective view of an alternative membrane embodiment according to the present invention.

Referring to FIGS. 1-5, there is shown an athletic shoe, including a sole structure and a cushioning device as one example of a product employing a barrier membrane in accordance with the teachings of the present invention. The shoe 10 includes a shoe upper 12 to which the sole 14 is attached. The shoe upper 12 can be formed from a variety of conventional materials including, but not limited to, leathers, vinyls, nylons and other generally woven fibrous materials. Typically, the shoe upper 12 includes reinforcements located around the toe 16, the lacing eyelets 18, the top of the shoe 20 and along the heel area 22. As with most athletic shoes, the sole 14 extends generally the entire length of the shoe 10 from the toe region 20 through the arch region 24 and back to the heel portion 22.

Figure 9:
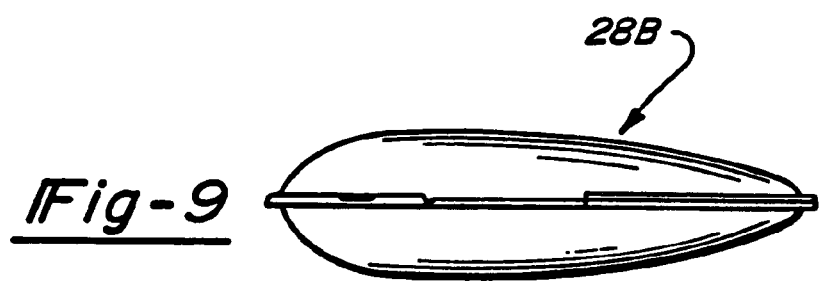
FIG. 9 is a side view of the membrane illustrated in FIG. 8.
Figure 10:
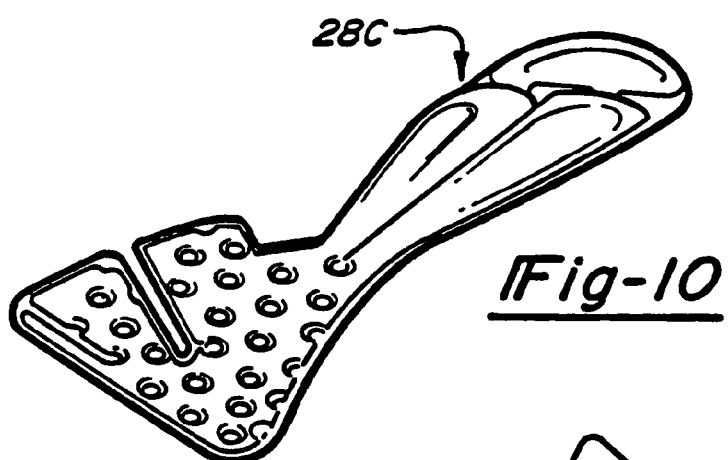
FIG. 10 is a perspective view of an alternative membrane embodiment according to the present invention.
Figure 11:
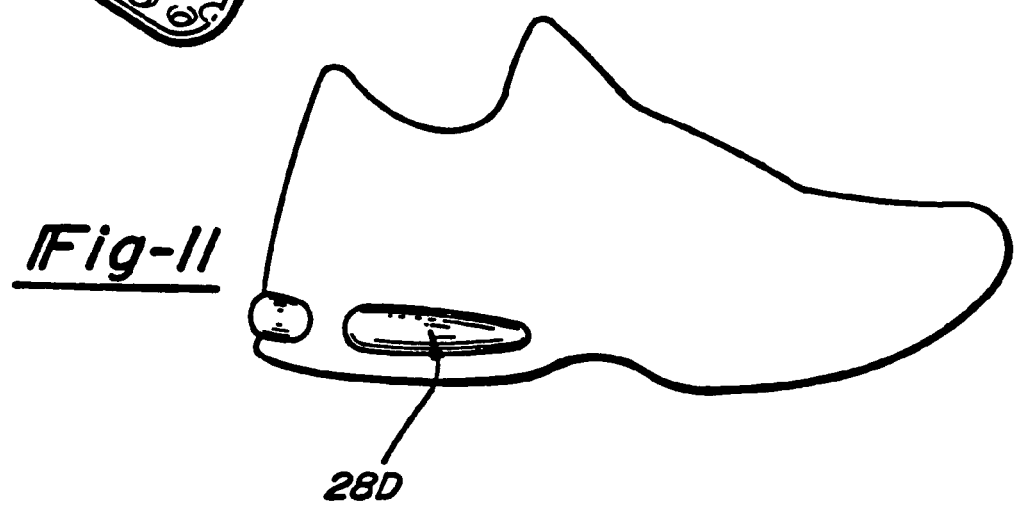
FIG. 11 is a side elevational view of an athletic shoe having an alternative membrane embodiment according to the present invention.
Figure 12:
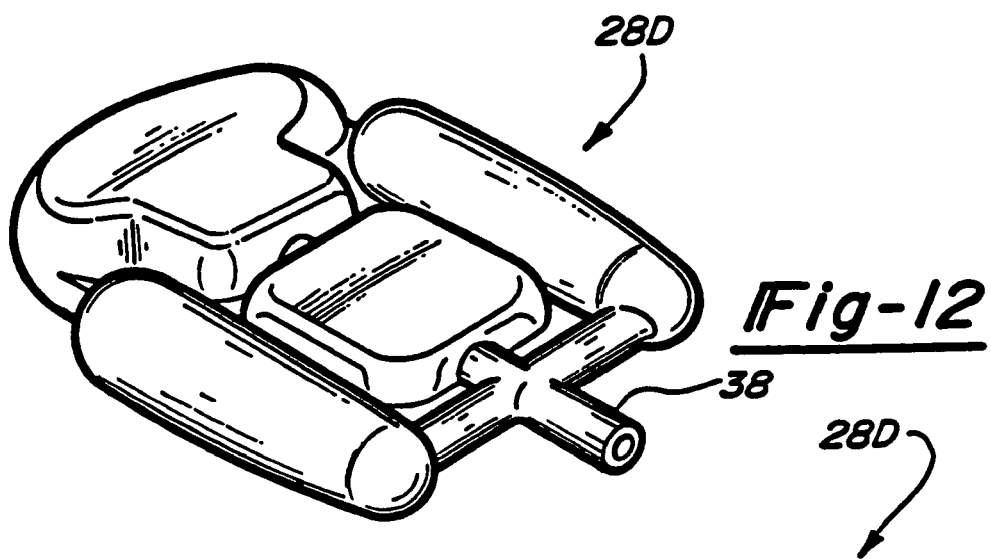
FIG. 12 is a perspective view of the membrane illustrated in FIG. 11.
Figure 13:
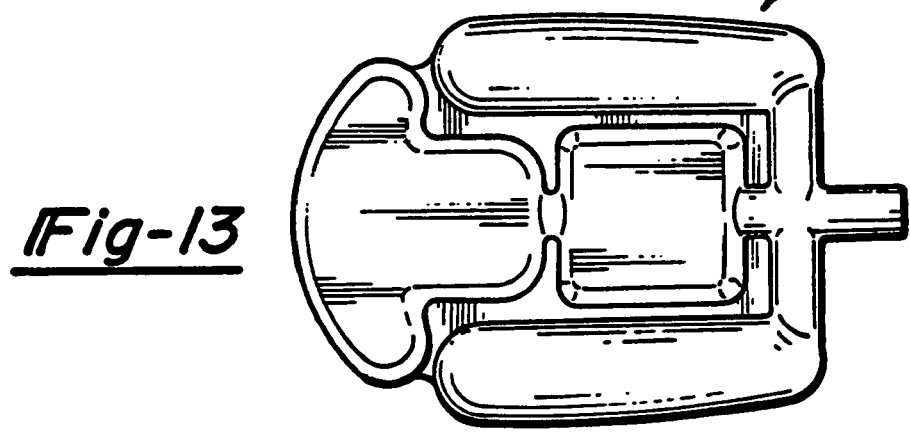
FIG. 13 is a top elevation view of the membrane illustrated in FIGS. 11 and 12.
Figure 14:
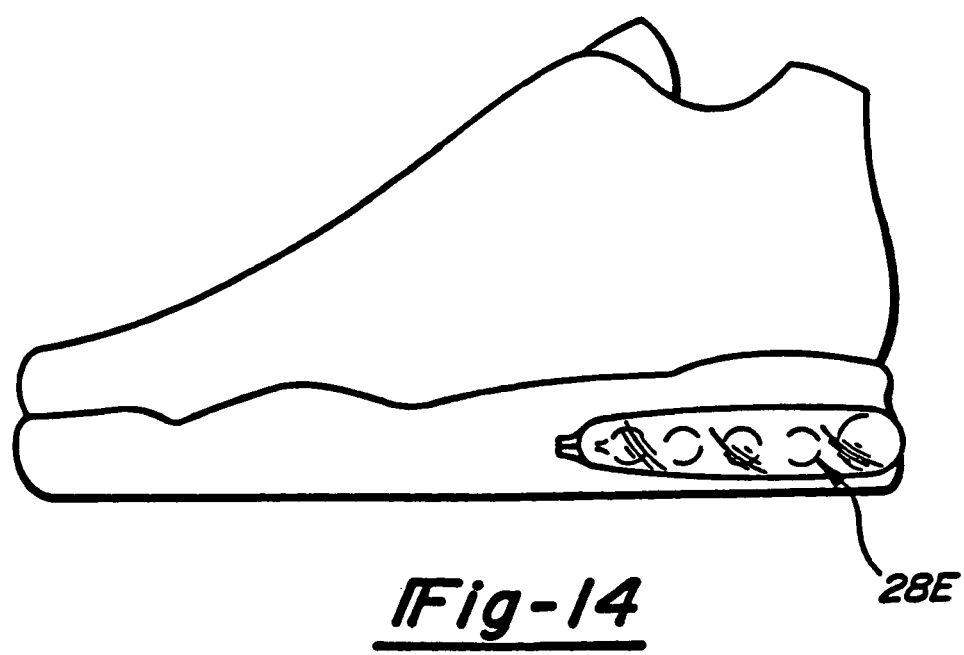
FIG. 14 is a side elevation view of an athletic shoe having another alternative membrane embodiment according to the present invention.
Figure 17:
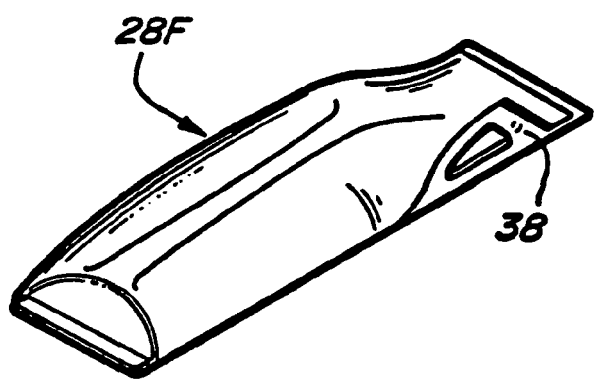
FIG. 17 is a perspective view of an alternative membrane embodiment according to the teachings of the present invention.
Figure 18:
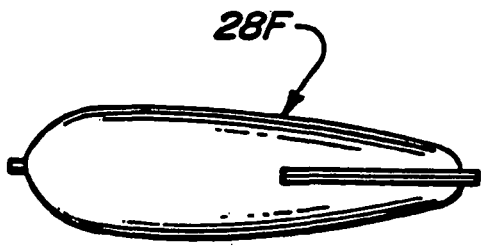
FIG. 18 is a side view of the membrane illustrated in FIG. 17.

The sole structure 14 includes one or more selectively permeable barrier membranes 28 in accordance with the present invention, which are preferably disposed in the midsole H of the sole structure. By way of example, the barrier membranes 28 of the present invention can be formed having various geometries such as the plurality of tubular members which are positioned in a spaced apart, parallel relationship to each other within the heel region 22 of the mid sole 26 as illustrated in FIGS. 1-5. The tubular members are sealed to contain an injected captive gas. More specifically, each of the barrier membranes 28 are formed to include a barrier layer which permits diffusion of mobile gases therethrough but which resists or prevents diffusion of the captive gases. These predetermined diffusion properties of the membrane 28 are provided by an inner barrier layer 30 which is disposed along the inner surface of a thermoplastic outer layer 32. These two membrane layers may be best seen in FIGS. 4 and 5. As previously noted, the barrier membranes 28 of the present invention can be formed in a variety of configurations or shapes. For example, alternative membranes 28B could be formed in the shape of a heel ped as illustrated in FIGS. 8 and 9. Athletic shoes including the heel ped configurations set forth in FIGS. 8 and 9 have been used commercially and sold under the trademark Air Health Walker Plus™ by Nike, Inc. of Beaverton, Oreg. The heel ped configuration of FIGS. 8 and 9 is also shown in U.S. Design patent application Ser. No. 007,934, filed on Apr. 20, 1993. Similarly, heel peds having a geometry substantially similar to the membrane embodiment 28C illustrated in FIG. 10 have been used in athletic shoes sold under the trademark Air Structure II™ by Nike, Inc. The heel ped configuration of FIG. 10 is also shown in U.S. Design Pat. No. 343,504, issued on Jan. 25, 1994. By way of further example, an alternate membrane 28D illustrated with reference to FIGS. 11-13, is currently used in athletic shoes sold under the trademarks Air Max$^2$™ and Air Max$^2$CB™, also owned by Nike, Inc. are formable in accordance with the teachings of the present invention. This membrane configuration is also shown in U.S. Design Pat. No. 349,804, issued on Aug. 23, 1994, and U.S. Design Pat. No. 350,016 issued on Aug. 30, 1994. Yet, another alternative membrane 28E is illustrated with reference to FIGS. 14-16. The membrane 28E is currently utilized in athletic shoes sold under the trademark Air Max™ by Nike, Inc. This membrane configuration is also shown in U.S. Design patent application Ser. No. 897,966, filed on Jun. 12, 1992. Still another membrane configuration designated by reference numeral 28F is illustrated in FIGS. 17 and 18. As should be appreciated by this point, barrier membrane configurations under the present invention (whether in the form of a tube, an elongated ped or other such configuration), may either be fully or partially encapsulated within the midsole or out-sole of an article of footwear.

Referring again to FIGS. 1-5, a barrier membrane 28 in accordance with teachings of the present invention is provided in the form of a cushioning device. As shown, the membrane 28 has a composite structure including an outer layer 32 formed of a flexible resilient elastomeric material which preferably is resistant to expansion beyond a predetermined maximum volume for the membrane when subjected to gaseous pressure. The membrane 28 also includes an inner layer 30 formed of a barrier material which allows for controlled diffusion pumping or self-pressurization.

The outer layer 32 preferably is formed of a material or combination of materials which offer superior heat sealing properties, flexural fatigue strength, a suitable modulus of elasticity, tensile and tear strength and abrasion resistance. Among the available materials which offer these characteristics, it has been found that thermoplastic elastomers of the urethane variety, otherwise referred to herein as thermoplastic urethanes or simply TPU's, are highly preferred because of their excellent processibility.

Among the numerous thermoplastic urethanes which are useful in forming the outer layer 32, urethanes such as PELLETHANE™ 2355-85ATP and 2355-95AE (trademarked products of the Dow Chemical Company of Midland, Mich.), ELASTOLLAN® (a registered trademark of the BASF Corporation) and ESTANE® (a registered trademark of the B.F. Goodrich Co.), all of which are either ester or ether based, have proven to be particularly useful. Still other thermoplastic urethanes based on polyesters, polyethers, polycaprolactone and polycarbonate macroglycols can be employed. In general, the thermoplastic urethane(s) employed to form the outer layer 32 will be aromatic in nature.

The inner layer 30, which is the main barrier constituent primarily responsible for controlling gas permeation, is made from a combination or blend of one or more aliphatic thermoplastic urethanes and one or more copolymers of ethylene and vinyl alcohol. The aliphatic thermoplastic urethanes employed in the inner barrier layer, if not commercially available, are generally formed by the reaction product of at least one of each of the following: (a) polyester and/or polyether diol; (b) difunctional extender; (c) aliphatic isocyanates and/or diisocyanates; and (d) optionally, a catalyst.

Among the numerous polyester diols (otherwise referred to herein as polyester polyols) which are considered to be useful in accordance with the teachings of the present invention, those which are obtained by the esterification of an aliphatic or aromatic dibasic acid or anhydride with a glycol are considered to be particularly useful. Preferably, the glycol is employed in excess of the stoichiometric proportion with respect to the acid or anhydride in order to ensure that the polyesters are hydroxyl-terminated. As previously noted, ideally any polyester diols employed will have a molecular weight ranging from about 300 to about 4,000, more preferably from about 400 to about 2,000, and still more preferably from about 500 to about 1,500, as calculated according to the procedure set forth in ASTM D-4274.

Representative dicarboxylic acids (or their anhydrides) employed in the preparation of the polyester diols are adipic, succinic, pimelic, suberic, azelaic, sebacic, terephthalic, phthalic, and the like acids or their anhydrides or mixture of two or more of said acids or anhydrides. Adipic acid is the preferred acid. Representative glycols employed in the preparation of the polyalkylene ester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

Representative of glycols employed in the preparation of the polyoxyalkylene ester diols are diethylene glycol, dipropylene glycol, and the like.

Representative of the polyoxyalkanoyl diols are the polycaprolactone diols which are prepared by polymerizing the appropriate caprolactone with the appropriate difunctional initiator, such as an aliphatic glycol or an alkanolamine, and the like. For a further understanding of the procedures and products for obtaining the various polyol esters, reference can be made to U.S. Pat. No. 2,914,556, which is hereby expressly incorporated by reference.

Preferred species of polyester diols include polyethylene adipate, polypropylene adipate, and polybutylene adipate.

Among the numerous polyether diols (otherwise referred to herein as polyether polyols) which can be employed in accordance with the teachings of the present invention, those including hydroxyl (polyalkylene oxides), or polyether macroglycols are generally preferred. Ideally, the polyether macroglycols employed are linear hydroxyl-terminated compounds having ether linkages as the major linkage joining carbon atoms. The molecular weights may vary from between about 300 to about 6,500, more preferably from about 400 to about 4,500, and still more preferably from about 500 to about 3,000, also based on ASTM D-4274. The hydroxyl (polyalkylene oxides) such as hydroxyl poly (tetramethylene oxide), hydroxyl poly (trimethylene oxide), hydroxyl poly (hexamethylene oxide), hydroxyl poly (ethylene oxide) and the like of the formula $HO[(CH_2)_nO]_xH$ wherein n is a number from 2 to 6 and x is an integer, and alkyl substituted types such as hydroxyl poly (1,2-propylene oxide); tetrahydrofuran and ethylene oxide copolyethers are all considered to be useful examples.

Among the difunctional extenders employed in accordance with the teachings of the present inventions are those generally selected from the group consisting of aliphatic extenders including ethylene glycol, 1,3-propylene glycol, 1,2-propylene glycol, 1,4-butanediol, 1,2-hexanediol, neopentyl glycol, and the like; and dihydroxyalkylated aromatic compounds such as the bis (2-hydroxyethyl) ethers of hydroquinone and resorcinol; p-xylene-$\alpha,\alpha'$-diol; the bis (2-hydroxyethyl) ether of p-xylene-$\alpha,\alpha'$-diol; m-xylene-$\alpha,\alpha'$-diol and the bis (2-hydroxyethyl) ether thereof. Illustrative of diamine extenders are aromatic diamines such as p-phenylenediamine, m-phenylenediamine, benzidine, 4,4'-methylenedianiline, 4,4'-methylenibis (2-chloroaniline) and the like. Illustrative of amino alcohols are ethanolamine, propanolamine, butanolamine, and the like.

Preferred extenders include ethylene glycol, 1,3-propylene glycol, 1,4-butanediol, 1,2-hexanediol, 1,6-hexanediol and the like.

Generally, the ratio of polyol (whether ester or ether based) to extender can be varied within a relatively wide range depending largely on the desired hardness of the final polyurethane elastomer. As such, the equivalent proportion of polyester and/or polyether diol to extender should be within the range of 1:1 to 1:12 and, more preferably, from 1:1 to 1:8.

Among the aliphatic isocyanates and, more particularly, aliphatic diisocyanates employed those including isophorone diisocyanate (IPDI), methylene bis 4-cyclohexyl isocyanate, cyclohexyl diisocyanate (CHDI), hexamethylene diisocyanate (HDI), m-tetramethyl xylene diisocyanate (m-TMXDI), p-tetramethyl xylene diisocyanate (P-TMXDI) and xylylene diisocyanate (XDI) are considered to be particularly useful. Generally, the diisocyanate(s) employed are proportioned such that the overall ratio of equivalents of isocyanate to equivalents of active hydrogen containing materials is within the range of 0.95:1 to 1.10:1, and preferably 0.98:1 to 1.04:1.

As previously noted, it is frequently desirable to include a catalyst in the reaction mixture to prepare the compositions of the present invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228-232; see also, Britain et al., J. Applied Polymer Science, 4, 207-211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, $N_1N_1N'_1N'$-tetramethylethylenediamine, $N_1N_1N'_1N'$-tetraethylethylenediamine, N-methyl-morpholine, N-ethylmorpholine, $N_1N_1N'_1N'$-tetramethylguanidine, and $N_1N_1N'_1N'$-tetramethyl-1,3-butanediamine.

Regardless of the catalyst(s) which is utilized, if any, the weight percentage of such material is typically less than one half of one percent by weight (0.5 wt. %) based on the total weight of the aliphatic thermoplastic urethane reaction mixture.

As noted, it is also possible to employ various commercially available aliphatic thermoplastic urethanes such as those marketed under the tradename MORTHANE® which is a registered trademark of Morton International of Chicago, Ill. Among the various commercially available polyester based aliphatic thermoplastic urethanes which are considered to be useful, those sold as MORTHANE PN03-204, PN03-214 and PN3429-100 are believed to be particularly useful. Still other commercially available polyester based aliphatic thermoplastic urethanes which can be employed include those sold under the trademark TEXIN™ by BAYER AG (America) of Pittsburgh, Pa. An example of the TEXIN™ polyester based aliphatic thermoplastic urethanes considered to be useful is that sold as TEXIN DP7-3013.

As for the aliphatic polyether based thermoplastic urethanes, those sold as MORTHANE PE192-100, PE193-100 and PE194-100 are believed to be particularly useful. Still other commercially available polyether based aliphatic thermoplastic urethanes include those sold under the trademark TECOFLEX™ by Thermedics, Inc., of Woburn, Mass. Among the useful examples of TECOFLEX™ polyether based aliphatic urethanes are those sold under the trade designations TECOFLEX EG-80A, EG-85A, EG-93A, EG-60D, EG-65D and EG-72D. Further, a commercially available polyether based aliphatic urethanes known as DP7-3005, DP7-3006 and DP7-3007 available from Bayer AG (America) are also considered useful.

Regardless of which aliphatic thermoplastic urethane is employed (i.e. reaction product or commercially available product), the blended barrier layer 30 will generally include up to 50.0 wt. % aliphatic thermoplastic urethane but, more preferably, will include between about 1.0 wt. % to about 30.0 wt. % aliphatic thermoplastic urethanes. Under highly preferred embodiments, the aliphatic thermoplastic urethane constituency of the barrier layer 30 will be present in the range of between about 5.0 wt. % to about 25.0 wt. %.

Among the copolymers of ethylene and vinyl alcohol employed in the blend forming the barrier layer 30 those including commercially available products such as SOARNOL™ which is available from the Nippon Gohsei Co., Ltd. (U.S.A.) of New York, N.Y., and EVAL® which is available from Eval Company of America, Usle, Ill. have proven to be useful. Highly preferred commercially available copolymers of ethylene and vinyl alcohol such as EVAL® LCF101A will typically have an average ethylene content of between about 25 mol % to about 48 mol %. In general, ethylene contents within this range give rise to stronger bonding between the respective layers of thermoplastic urethane and ethylene-vinyl alcohol copolymers.

With regard to the use of so-called processing aids, minor amounts of antioxidants, UV stabilizers, mold release agents and non-sticking agents as are known in the art may be employed wherein the total constituency of all "processing aids" is generally less than 3.0 wt. %.

For certain embodiments, it may also be useful to include a relatively small amount of at least one aromatic thermoplastic urethane in the blended barrier layer 30 as a viscosity modifier. Under those embodiments employing at least one aromatic thermoplastic urethane, the total amount will generally be 3 wt. % or less based on a 100 wt. % constituency of the barrier layer. Thus, the composition of the blended barrier layer can be summarized as including: (1) 50 wt. % to about 97 wt. % of at least one copolymer of ethylene and vinyl alcohol; (2) 3 wt. % to about 50 wt. % of at least one aliphatic thermoplastic urethane; and (3) up to about 3 wt. % of one or more aromatic thermoplastic urethanes, wherein the total constituency of the barrier layer is equal to 100 wt %. The aromatic thermoplastic urethanes are also selected from the group consisting of polyester, polyether, polycaprolactone, polyoxypropylene and polycarbonate macroglycol based materials and mixtures thereof.

As previously noted, the barrier membranes as disclosed herein can be formed by various processing techniques including but not limited to extrusion, blow molding, injection molding, vacuum molding and heat sealing or RF welding of tubing and sheet extruded film materials. Preferably, all will be described in greater detail below, the membranes of the present invention are made from films formed by co-extruding the outer layer of thermoplastic urethane material and the inner layer of the blended aliphatic thermoplastic urethane and copolymer of ethylene and vinyl alcohol together to effectively produce multi-layered film materials with the resulting barrier membranes produced from this material. Subsequently, after forming the multi-layered film materials, the film materials are heat sealed or welded by RF welding to form the inflatable barrier membranes which have the characteristics of both high flexibility and diffusion pumping capabilities.

Referring to FIGS. 6 and 7, an alternative barrier membrane embodiment 28A in the form of an elongated tubular shaped multi-layered component is illustrated. The modified barrier membrane 28A is essentially the same as the composite structure illustrated in FIGS. 1-5 except that a third layer 34 is provided contiguously along the inner surface of the barrier layer 30, such that the barrier layer 30 is sandwiched between the outer layer 32 and innermost layer 34. The innermost layer 34 is also preferably made from a thermoplastic urethane based material to add further protection against moisture coming in contact with the barrier layer 30. In addition to the benefits of enhanced protection against degradation of the barrier layer 30, layer 34 also tends to assist in providing for high quality welds which allow for the three-dimensional shapes of the cushioning devices.

The cushioning devices shown in FIGS. 1-7 are preferably fabricated from multi-layered extruded tubes. Lengths of the coextruded tubing ranging from one foot to coils of up to 5 feet, are inflated to a desired initial inflation pressure ranging from 0 psi ambient to 100 psi, preferably in the range of 5 to 50 psi, with the captive gas preferably being nitrogen. Sections of the tubing are RF welded or heat sealed to the desired lengths. The individual cushioning devices produced are then separated by cutting through the welded areas between adjacent cushioning devices. It should also be noted that the cushioning devices can be fabricated with so-called lay flat extruded tubing as is known in the art whereby the internal geometry is welded into the tube.

As the blended first layer including one or more aliphatic urethanes and one or more copolymers of ethylene and vinyl alcohol and the second layer including thermoplastic urethane advance to the exit end of the extruder through individual flow channels, once they near the die-lip exit, the melt streams are combined and arranged to float together in layers typically moving in laminar flow as they enter the die body. Ideally, the materials are combined at a temperature of between about 300° F. to about 450° F. and a pressure of at least about 200 psi to obtain optimal wetting for maximum adhesion between the contiguous portions of the layers 30, 32 and 34 respectively.

The membrane 28A as shown in FIGS. 6 and 7 comprises three layers including a first layer of barrier material 30 sandwiched between second and third layers 32 and 34, respectively, of thermoplastic urethane. In a highly preferred embodiment, the two thermoplastic urethane layers and the blended barrier layer of one or more aliphatic urethanes and one or more copolymers of ethylene and vinyl alcohol are coextruded at temperatures sufficient to cause a reactive contact in the form of hydrogen bonding to occur along at least a predetermined segment of the barrier membrane, thus eliminating the need for an intermediate adhesive or bonding layer.

To this end, it is believed that significant bonding occurs as the result of available hydrogen molecules being donated by the vinyl alcohol groups of the ethylene-vinyl alcohol copolymer along the length of the laminated membrane and hydroxyl and urethane carbonyl groups, or simply the available polar groups of aliphatic thermoplastic urethane.

The preferred compositions and methods of the present invention rely exclusively on the inherent properties of the thermoplastic urethane of the second and third layers and the blended barrier layer including aliphatic thermoplastic urethane and one or more copolymers of ethylene and vinyl alcohol when brought into contact according to the methods of the present invention for adhesion.

The theoretical chemical reaction which forms a surface bond between layers 32 and 34 with layer 30 across substantially the entire intended contact surface area of the membrane 28A can be summarized as follows:

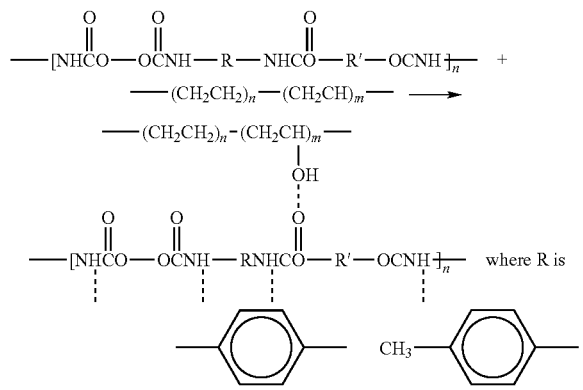

and R' is a short chain diol such as $(CH_2)_4$

In addition to the aforementioned theoretical hydrogen bonding, to a more limited extent, it is believed that a certain amount of covalent bonds are formed between the second and third layers 32 and 34, respectively, with the first barrier layer 30. Still other factors such as orientation forces and induction forces, otherwise known as van der Waals forces, which result from London forces existing between any two molecules and dipole-dipole forces which are present between polar molecules are believed to contribute to the bond strength between contiguous layers of thermoplastic urethane and the main barrier layer.

The hydrogen bonding between layers of thermoplastic urethane and the barrier layer including one or more aliphatic urethanes and one or more copolymers of ethylene and vinyl alcohol of the present invention is in contrast to prior art embodiments which, failing to recognize the existence and/or potential of such bonding, typically have used adhesive tie-layers such as Bynel®, for example, to improve and maintain the bonding between the various layers of thermoplastic urethane and ethylene vinyl alcohol.

It should also be noted that fillers such as non-polar polymeric materials and inorganic fillers or extenders such as talc, silica, mica, etc., tend to negatively effect the bonding capacity of the thermoplastic urethane and the blended layer including at least one aliphatic urethane and at least one copolymer of ethylene and vinyl alcohol. Thus, the use of fillers in processing the layers 30, 32 and 34 should be extremely limited, if used at all.

Figure 15:
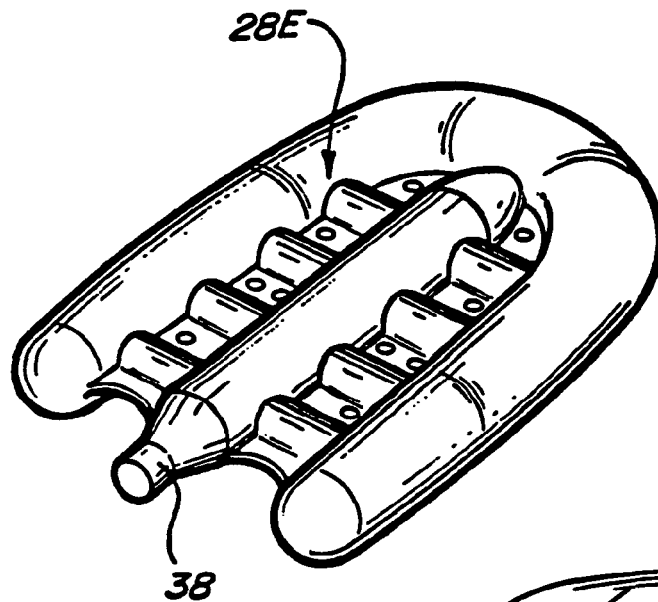
FIG. 15 is a perspective view of the membrane illustrated in FIG. 14.
Figure 16:
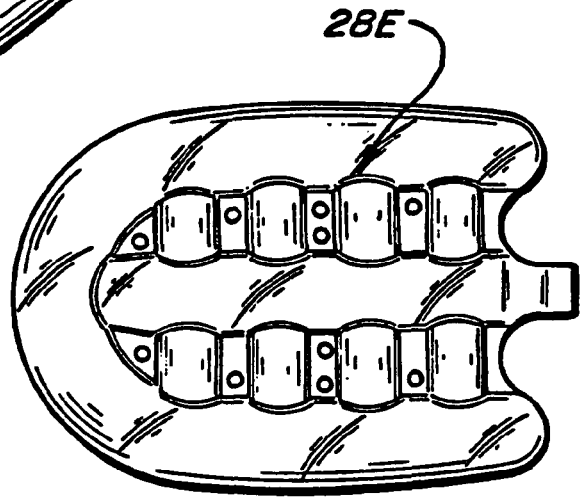
FIG. 16 is a top view of the membrane illustrated in FIGS. 14 and 15.
Figure 21:
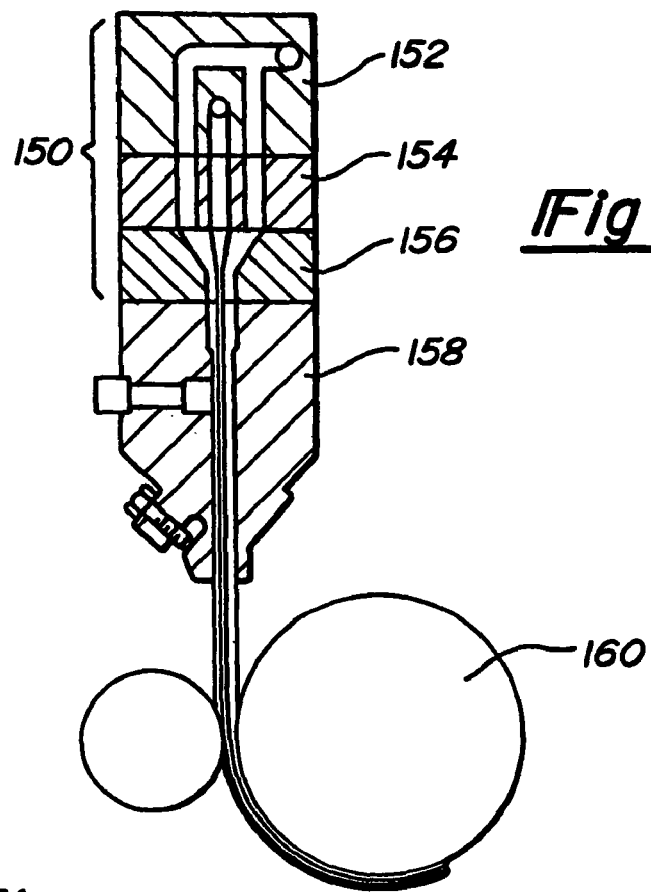
FIG. 21 is a side elevation view of a sheet co-extrusion assembly.
Figure 23:
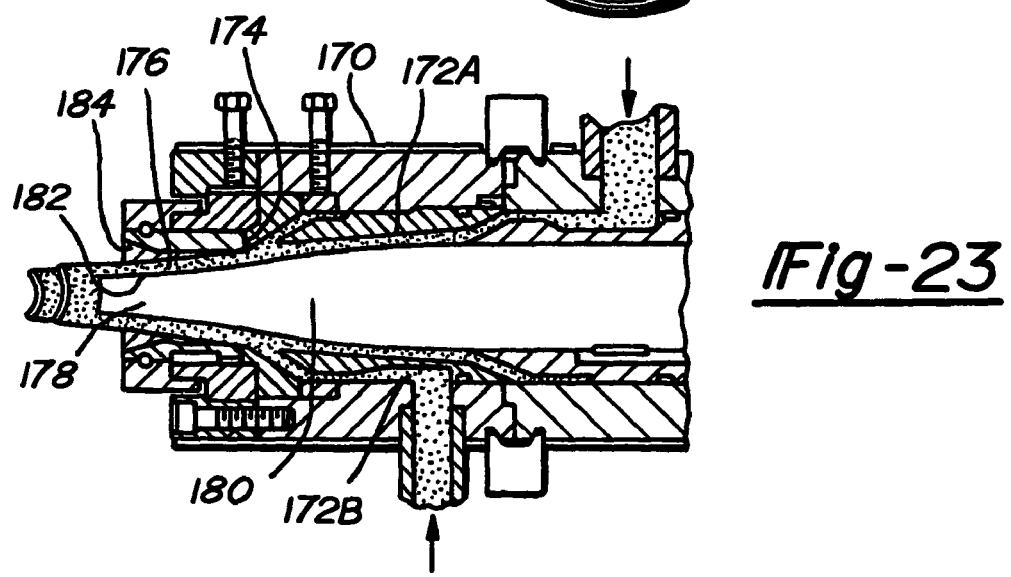
FIG. 23 is a side elevation view of a tubing co-extrusion assembly.
Figure 22:
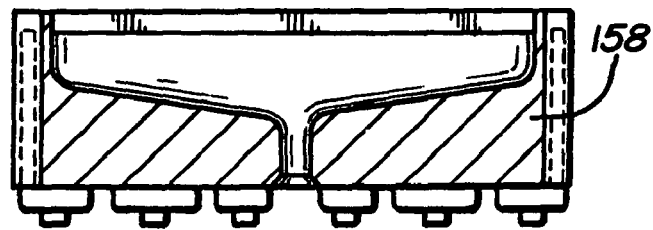
FIG. 22 is a cross-sectional view of the manifold portion of the sheet co-extrusion assembly of FIG. 21.

Referring to FIGS. 12-16, barrier membranes in the form of air bladders, otherwise referred to herein as cushioning devices, which are fabricated by blow molding are shown. To form the air bladders, parisons of two layer, or preferably three layer film are first coextruded as illustrated in FIGS. 21-23, and thereafter, the parisons are blown and formed using conventional blow molding techniques. The resulting bladders, shown best in FIGS. 12 and 15 are then inflated with the desired captive gas to the preferred initial inflation pressure and then the inflation port (e.g. inflation port 38) is sealed by RF welding.

Another air bladder embodiment formed from the barrier membranes described herein is shown in FIGS. 8-10. Sheets or films of coextruded two layer, or preferably three layer film are first formed, with the thickness range of the coextruded sheets or films generally being between 0.5 mils to 10 mils for the barrier layer 30 and between 5 mils to about 100 mils for the thermoplastic urethane layers 32 and 34, respectively. Two sheets of the multi-layer film are placed on top of each other and welded together along selected points using conventional heat sealing techniques or RF welding techniques. The uninflated bladder is then inflated through a formed inflation port to the desired initial inflation pressure which ranges from 0 psi ambient to 100 psi, and preferably 5 to 50 psi. As previously noted, the preferred captive gas is nitrogen.

Still another air bladder embodiment formed from a barrier membrane of the present invention is shown in FIGS. 17 and 18. The air bladder is fabricated by forming co-extruded two and three layer tubing having a thickness range of the co-extruded tubing wall, i.e. a cross-section through all layers, of between 0.5 mils to about 10 mils for the barrier layer 30 and between about 5 mils to about 100 mils for the thermoplastic urethane layers 32 and 34, respectively. The tubing is collapsed to a lay flat configuration and the opposite walls are welded together at selected points and at each end using conventional heat sealing techniques or RF welding. The bladder is then inflated through the formed inflation port 38 to the desired inflation pressure which ranges from 0 psi ambient to 100 psi, and preferably from 5 to 50 psi, with the preferred captive gas being nitrogen.

The various products described in FIGS. 1-18 are designed to be used as midsoles for articles of footwear, and particularly in athletic shoes. In such applications, the inflatable membranes may be used in any one of several different embodiments including: (1) completely encapsulated in a suitable midsole foam; (2) encapsulated only on the top portion of the unit to fill-in and smooth-out the uneven surfaces for added comfort under the foot; (3) encapsulated on the bottom portion to assist attachment of the out-sole; (4) encapsulated on the top and bottom portions but exposing the perimeter sides for cosmetic and marketing reasons; (5) encapsulated on the top and bottom portions but exposing only selected portions of the sides of the unit; (6) encapsulated on the top portion by a molded "Footbed"; and (7) used with no encapsulation foam whatsoever.

In addition to employing the barrier membranes of the present invention as cushioning devices or air bladders as described above, still another highly desirable application for the barrier membranes of the present invention is for accumulators as illustrated in FIGS. 19 and 20.

Referring to FIGS. 19 and 20, there are shown two alternative accumulator embodiments formed from the barrier membrane materials of the present invention. According to FIG. 19, a bladder in the form of a hydraulic accumulator which is used for vehicle suspension systems, vehicle brake systems, industrial hydraulic accumulators or for any accumulators having differential pressures between two potentially dissimilar fluid media is illustrated. The bladder 124 separates the hydraulic accumulator into two chambers or compartments, one of which contains a gas such as nitrogen and the other one of which contains a liquid. Bladder 124 includes an annular collar 126 and a flexible partition 128. Annular collar 126 is adapted to be secured circumferentially to the interior surface of the spherical accumulator such that partition 128 divides the accumulator into two separate chambers. Flexible partition 128 moves generally diametrically within the spherical accumulator and its position at any given time is dependant upon the pressure of the gas on one side in conjunction with the pressure of the liquid on the opposite side.

By way of further example, FIG. 20 illustrates a product manufactured using a combination of the barrier membrane 110, which includes a barrier layer 114 formed from a combination or blend of one or more aliphatic thermoplastic urethanes and one or more copolymers of ethylene and vinyl alcohol, is disposed intermittently between an inner layer 112 and an outer layer 116 of thermoplastic urethane. It may be desirable to utilize these so-called intermittent constructions under circumstances where the delamination potential along certain segments of a product is generally relatively high. One such location is along the annular collar 128 of bladder or diaphragm for hydraulic accumulators. Thus, it should be recognized that the barrier membranes 110 described herein can include segments which do not include one or more layers of the blend of at least one aliphatic thermoplastic urethane and at least one copolymer of ethylene and vinyl alcohol.

Preferably, the aliphatic thermoplastic polyurethane and ethylene vinyl alcohol copolymer employed are not modified in an effort to create cross-linking or conventional covalent bonding between the two layers; nor are any tie-layers or adhesive employed. The preferred compositions and methods of the present invention rely exclusively on the inherent properties of the aliphatic thermoplastic urethane and copolymer of ethylene and vinyl alcohol when brought into reactive contact according to the methods of the present invention, e.g., to maximize and rely primarily upon hydrogen bonding occurring between the respective layers.

To form the barrier membranes 110 according to the teachings of the present invention, a number of different processes can be used, including but not limited to, coextrusion blow molding utilizing continuous extrusion, intermittent extrusion utilizing (1) reciprocating screw systems, (2) ram accumulator-type systems; (3) and accumulator head systems, coinjection stretch blow molding, or co-extruded sheet, blown film, tubing or profiles. It has been found that multi-layer processes such as tubing, sheet and film extrusion, blow molding utilizing co-extrusions give rise to products which appear to demonstrate the desired significant hydrogen bonding between the respective layers of thermoplastic urethane and the barrier layer(s) including a blend of aliphatic thermoplastic urethane and copolymers of ethylene and vinyl alcohol. To form a product such as a hydraulic accumulator via a multi-layer process, such as blow molding, commercially available blow molding machines such as a Bekum BM502 utilizing a co-extrusion head model no. BKB95-3B1 (not shown) or a Krup KEB-5 utilizing a model no. VW60/35 co-extrusion head (not shown) can be utilized.

A brief description of mufti-layer processing techniques will now be provided. Initially, the resinous materials (namely the thermoplastic urethanes and the barrier material including a blend of at least one aliphatc thermoplastic urethane and at least one copolymer of ethylene and vinyl alcohol) are first dried to the manufacturer's specification (if necessary) and thereafter are fed to an extruder. Typically, the materials are fed into the extruders according to the order in which the layers are to be arranged (for example TPU in an outside extruder, the blend of aliphatic TPU and EVOH in a middle extruder and TPU in inside extruder). The extruder heat profile is set for the best processing of the individual materials. However, it is suggested that no more than a 20° F. difference be present at the exit point of each extruder. As the material is forced forward in each extruder the heat profile is set to achieve the best molten mass. The heat profile would typically be set for between 300° F. to about 450° F. with the feed zone being the lowest set point and all other set points gradually increasing in increments of approximately 10° F. until the desired melt is achieved. Once leaving the extruders a section of pipes is sometimes used to direct the material to the multi-layered head (i.e. three or more heads). It is at this point that any adjustments for differences in heat be addressed. The pumping action of the extruders not only forces the material into the individual head channels or flow paths but also determines the thickness of each layer. As an example, if the first extruder has a 60 mm diameter, the second has an extruder 35 mm diameter and the third extruder has a 35 mm diameter, the speed required to produce a 1.3 liter bladder or diaphragm requiring 2 mm for the outside layer of TPU, 3 mils for the barrier layer and 2 mm for the inside layer of TPU is approximately a cycle time of 26 seconds. The first extruder would have a screw speed of about 10 rpm's, the second extruder would have a screw speed of about 5 rpm's and the third extruder would have a screw speed of about 30 rpm. Once entering the head channels or flow paths, the heat would normally be held constant or be decreased to adjust for the melt strength of the materials. The individual head channels or flow paths keep separate the molten masses while directing them downward and into the shape of a parison.

Just prior to entering the lower die or bushing and the lower mandrel, the material head channels or flow paths are brought together under the pressure created by the now unitary flow path surface area, the gap between the lower bushing and mandrill and the pressure on the individual layers from the respective extruders. This pressure must be at least 200 psi and is normally, under the conditions described, in excess of 800 psi. At the point where the materials come together one parison is now formed that is a laminate made up of the three layers including a first layer including a blend of at least one aliphatic thermoplastic urethane and at least one copolymer of ethylene and vinyl alcohol, and a second and third layers of thermoplastic urethane disposed along opposite sides of the first layer. The upper limit of the pressure is essentially only constrained by the physical strength of the head. After exiting the head, the laminate is closed on each end by two mold halves and a gas such as air is injected into the mold forcing the laminated parison to blow up against the mold and be held in this fashion until sufficient cooling has taken place (i.e. approximately 16 seconds for the aforementioned sample), at which point the gas is exhausted. The part is then removed from the mold and further cooling occurs to allow for the part to be de-flashed or further processed as some parts may require. As should now be understood by those skilled in the art, the layers must be held separate until fully melted and preformed into a hollow tube at which time they are bonded together as described under heat and pressure.

As those skilled in the plastic forming industry will recognize, the three major components of a blow molding machine, namely the extruders, die heads and mold clamps, come in a number of different sizes and arrangements to accommodate the consumer production rate schedule and size requirements. Thus, the above described exemplary process can be modified.

By way of further example, a preferred multi-layer process known as sheet co-extrusion will now be described in greater detail. Sheet co-extrusion involves an extrusion technique for the simultaneous extrusion of two or more polymers through a single die where the polymers are joined together such that they form distinct, well bonded layers forming a single extruded product According to the present invention, typical layer structures are defined as follows:

A-B

Two distinct layers consisting of two resins.

A-B-A

Three distinct layers consisting of two or three resins.

A-B-A-B-A

Five distinct layers consisting of two, three, four or five resins.

wherein A=a layer of thermoplastic urethane; and B=at least one layer formed from a resin including a blend of at least one aliphatic thermoplastic urethane and at least one copolymer of ethylene and vinyl alcohol.

The equipment required to produce co-extruded sheet consists of one extruder for each type of resin which are connected to a co-extrusion feed block such as that shown in FIGS. 21 and 23, which are commercially available from a number of different sources including the Cloreon Company of Orange, Tex. and Production Components, Inc. of Eau Claire, Wis. among others.

The co-extrusion feed block 150 shown in FIG. 21 consists of three sections. The first section 152 is the feed port section which connects to the individual extruders and ports the individual round streams of resin to the programming section 154. The programming section 154 then reforms each stream of resin into a rectangular shape the size of which is in proportion to the individual desired layer thickness. The transition section 156 combines the separate individual rectangular layers into one square port The melt temperature of the TPU A layers should be between about 300° F. to about 450° F. To optimize adhesion between the TPU A layers and the blended aliphatic TPU and EVOH copolymer B layer(s), the actual temperature of each melt stream should be set such that the viscosities of each melt stream closely match. The combined laminar melt streams are then formed into a single rectangular extruded melt in the sheet die 158 which preferably has a "coat hanger" design as shown in FIG. 22 which is now commonly used in the plastics forming industry. Thereafter the extrudate can be cooled utilizing rollers 160 forming a rigid sheet by either the casting or calendaring process.

Similar to sheet extrusion, the equipment required to produce co-extruded tubing also consists of one extruder for each type of resin with each extruder being connected to a common multi-manifolded tubing die. The polymer melt from each extruder enters a die manifold such as the one illustrated in FIG. 23 which is commercially available from a number of different sources including Canterberry Engineering, Inc. of Atlanta, Ga. and Genca Corporation of Clearwater, Fla. The polymers flow in separate circular flow channels 172A and 172B for the thermoplastic urethane and the blended aliphatic thermoplastic urethane and copolymer of ethylene and vinyl alcohol, respectively. The flow channels are then shaped into a circular annulus the size of which is proportional to the desired thickness for each layer. The individual melts are then combined to form one common melt stream just prior to the die entrance 174. The melt then flows through a channel 176 formed by the annulus between the outer surface 178 of a cylindrical mandrel 180 and the inner surface 182 of a cylindrical die shell 184. The tubular shaped extrudate exits the die shell and then can be cooled into the shape of a tube by many conventional pipe or tubing calibration methods. While a two component tube has been shown in FIG. 23 it should be understood by those skilled in the art that additional layers can be added through separate flow channels.

Regardless of the plastic forming process used, it is of paramount importance that a consistent melt of the resinous thermoplastic urethane, and blended aliphatic thermoplastic urethane and copolymer of ethylene vinyl alcohol are obtained to accomplish the desired extensive hydrogen bonding therebetween across the intended length or segment of the laminated product. Thus, the multi-layer processes utilized should be carried out at maintained temperatures of from about 300° F. to about 450° F. for the thermoplastic urethanes and the blend of aliphatic thermoplastic urethane and ethylene vinyl alcohol copolymer. Furthermore, it is important to maintain sufficient pressure of at least 200 psi at the point where the layers are joined and hydrogen bonding occurs for a sufficient amount of the hydrogen bonding to be maintained.

As previously noted, in addition to the excellent bonding which is achieved for the laminated barrier membrane embodiments of the present invention, another objective, especially with regard to barrier membranes employed in extended life applications such as in cushioning devices for footwear, is to provide barrier membranes which are capable of retaining captive gases for extended periods of time. In general, barrier membranes which offer gas transmission rate values of 10.0 or less for a 20 mils thickness as measured according to the procedures designated at ASTM D-1434-82 are acceptable candidates for extended life applications.

To analyze for gas transmission rates, Sample 1, as set forth in Table I below, was prepared by extruding TPU on a line consisting of a single screw extruder used in association with a three roll stack and winder to form a sheet having an average thickness of approximately 20 mils. After preparing blends of EVOH copolymer and aliphatic TPU utilizing a single screw extruder, Samples 2, 3 and 5 were prepared by coextruding the samples on a line employing three KILLION one inch extruders which fed the TPU layers and barrier layer separately to a feed block heated to a temperature of between 300° F.-450° F. which brought the materials together under pressure. Thereafter, the coextruder sheet was extruded downward onto a smooth steel chill roll and pressed through a nip at low pressure. Sample 4 was prepared by initially extruding a barrier layer to an average thickness of approximately 3 mils. Thereafter, a first TPU layer having an average thickness of approximately 8.5 mils was extrusion coated along one side of the barrier layer by feeding the barrier layer into the nip between two steel rolls which are simultaneously fed with molten TPU from the single screw extruder. Finally, a second layer of TPU having an average thickness of approximately 8.5 mils was extrusion coated to the other side of the barrier layer in the same manner.

With all samples prepared, gas transmission rates were calculated for each sample in accordance with the procedures set forth in ASTM D-1434-82.

As illustrated in Table I below, Sample 2 offered slightly better gas transmission rate results than those of Samples 3 and 4, however the laminates of Samples 3 and 4 not only offer very good resistance to undesired gas permeation, but are also believed to be more resistant to delamination.

TABLE I

| Sample # | Composition | GTR (cc/m$^2$ × atm × day) |
|---|---|---|
| 1 (Control) | TPU | 29.0 |
| 2 | TPU/EVOH/TPU | 0.79 |

TABLE I-continued

| Sample # | Composition | GTR (cc/m² × atm × day) |
|---|---|---|
| 3 | TPU/90 wt. % EVOH - 10 wt. % ATPU/TPU | 1.62 |
| 4 | TPU/80 wt. % EVOH - 20 wt. % ATPU/TPU | 1.14 |
| 5 | TPU/50 wt. % EVOH - 50 wt. % ATPU/TPU | 14.01 |

TPU = Dow Pellethane ™ 2355-87AE
ATPU = Morton PN-03
EVOH = EVAL ® LCF101A (32 mol. % ethylene)

From an applicability standpoint, the barrier membrane compositions illustrated in Samples 3 and 4 are considered to be the best available for use in products such as cushioning devices for footwear, where the membrane must be durable, flexible, readily processable, resistant to environmental degradation and offer excellent gas transmission controls.

While the above detailed description describes the preferred embodiment of the present invention, it should be understood that the present invention is susceptible to modification, variation and alteration without deviating from the scope and fair meaning of the subjoined claims.

What is claimed is:

1. A gas-filled cushioning device, comprising:
    a multi-layer film formed into a gas-filled membrane having an interior compartment containing at least one capture gas constituent,
    said multi-layer film including a first layer comprising a blend of at least one aliphatic thermoplastic polyurethane, at least one aromatic thermoplastic polyurethane, and at least one copolymer of ethylene and vinyl alcohol, wherein the first layer includes up to about 50 wt. % of the at least one aliphatic thermoplastic polyurethane and wherein the at least one aliphatic thermoplastic polyurethane is formed as the reaction product of (a) at least one member selected from the group consisting of polyester and polyether diols, (b) at least one difunctional extender, and (c) at least one aliphatic diisocyanate; and a second, outer layer comprising a flexible resilient elastomeric thermoplastic material,
    said multi-layer film being capable of selectively resisting an outward diffusion of said capture gas constituent and permitting an inward diffusion pumping of at least one mobile gas constituent,
    wherein hydrogen bonding occurs along a segment of the film between the first layer and the second layer.

2. The gas-filled cushioning device according to claim 1, wherein said first layer includes between about 1 wt. % to about 30 wt. % of the at least one aliphatic thermoplastic polyurethane.

3. The gas-filled cushioning device according to claim 1, wherein the thermoplastic material of said second layer comprises a thermoplastic polyurethane selected from the group consisting of polyester, polyether, polycaprolactone, polyoxypropylene and polycarbonate macroglycol based materials and mixtures thereof.

4. The gas-filled cushioning device according to claim 1, wherein the first layer including a blend of at least one aliphatic thermoplastic polyurethane and at least one copolymer of ethylene and vinyl alcohol has an average thickness of about 0.5 mils to about 10 mils and said second layer of thermoplastic material has an average thickness of about 5 mils to about 100 mils.

5. The gas-filled cushioning device according to claim 1, wherein said capture gas constituent is nitrogen.

6. The gas-filled cushioning device according to claim 2, wherein said first layer includes about 5 wt. % to about 25 wt. % of the at least one aliphatic thermoplastic polyurethane.

7. The gas-filled cushioning device according to claim 1, wherein said copolymer of ethylene and vinyl alcohol is selected from the group consisting of copolymers including an ethylene content of about 25 mol. % to about 48 mol. %.

8. The gas-filled cushioning device according to claim 1, wherein said first layer includes:
    (a) 50 wt. % to about 97 wt. % of the at least one copolymer of ethylene and vinyl alcohol;
    (b) 3 wt. % to about 50 wt. % of the at least one aliphatic thermoplastic polyurethane; and
    (c) up to about 3 wt. % of one or more aromatic thermoplastic polyurethanes;
    wherein the total constituency of said first layer is equal to 100 wt. %.

9. The gas-filled cushioning device according to claim 1, further comprising a third layer including a thermoplastic polyurethane selected from the group consisting of polyester, polyether, polycaprolactone, polyoxypropylene and polycarbonate macroglycol based materials and mixtures thereof; said third layer and said second layer being disposed so as to sandwich the first layer.

* * * * *

UNITED STATES PATENT AND TRADEMARK OFFICE
CERTIFICATE OF CORRECTION

PATENT NO. : 7,851,036 B2
APPLICATION NO. : 10/784090
DATED : December 14, 2010
INVENTOR(S) : Henry W. Bonk et al.

It is certified that error appears in the above-identified patent and that said Letters Patent is hereby corrected as shown below:

Column 2,
Line 63, "arch Cushion" should be --Arch Cushion--.

Column 5,
Line 5, quanitity" should be --quantity--.

Column 7,
Line 15, "extended" should be --extender--.

Column 13,
Line 40, "Usle" shouid be --Lisle--.

Column 17,
Line 61, "mufti-layer" should be --multi-layer--.

Column 19,
Line 7, after "product", insert --.--.
Line 35, after "port", insert --.--.

Column 22,
Line 14, Claim 4, "wherein the" should be --wherein said--.

Signed and Sealed this
Twenty-third Day of August, 2011

David J. Kappos
*Director of the United States Patent and Trademark Office*